United States Patent [19]

Sacharski et al.

[11] Patent Number: 5,714,264
[45] Date of Patent: Feb. 3, 1998

[54] AQUEOUS POWDER COATING DISPERSION FOR PACKAGING CONTAINERS

[75] Inventors: Lawrence Sacharski, Eastpointe, Mich.; Peter D. Clark, Totsuka, Japan; Joachim Woltering, Münster, Germany

[73] Assignee: BASF Lacke & Farben, AG, Muenster-Hiltrup, Germany

[21] Appl. No.: 544,688

[22] Filed: Oct. 18, 1995

[51] Int. Cl.⁶ ............................. B32B 27/38; B05D 3/02
[52] U.S. Cl. .................. 428/413; 428/418; 428/480; 427/195; 427/203; 427/383.7; 427/386; 427/388.4; 427/409; 427/410; 427/411; 525/438; 525/482; 525/87; 525/98; 525/103
[58] Field of Search .................. 428/413, 418, 428/480; 427/195, 203, 373.7, 386, 388.4, 405, 410, 411; 525/438, 482; 528/87, 98, 103

[56] References Cited

U.S. PATENT DOCUMENTS

| | | | |
|---|---|---|---|
| 3,962,486 | 6/1976 | Gerek | 427/34 |
| 4,183,974 | 1/1980 | Coucher | 427/28 |
| 4,268,542 | 5/1981 | Sakakibore | 427/195 |
| 4,340,698 | 7/1982 | De Jongh | 525/438 |
| 4,497,837 | 2/1985 | Oswald | 426/398 |
| 4,549,000 | 10/1985 | Widmer | 525/482 |
| 4,604,308 | 8/1986 | Widmer | 428/35 |

FOREIGN PATENT DOCUMENTS

| | | |
|---|---|---|
| 1429076 | 3/1976 | United Kingdom. |
| 2055843 | 3/1981 | United Kingdom. |

*Primary Examiner*—Leszek Kiliman

[57] ABSTRACT

The present invention relates to an aqueous powder coating dispersion based on epoxy resins and phenolic curing agents or carboxyl-containing polyesters for the coating of packaging containers, which dispersion consists of a solid, pulverulent component I and an aqueous component II, component I being a powder coating which contains A) at least one epoxy resin having an epoxide equivalent weight of from 300 to 5500 and B) at least one curing agent having more than one phenolic hydroxyl group per molecule and a hydroxyl equivalent weight, based on phenolic OH groups, of from 100 to 500, preferably from 200 to 300, or C) at least one polyester having an acid number of from 25 to 120 mg of KOH/g and an OH number >10 mg of KOH/g, and D) at least one epoxy resin having an epoxide equivalent weight of from 400 to 3000, and component II being the aqueous component of the dispersion which contains at least one nonionic or anionic thickener.

30 Claims, No Drawings

AQUEOUS POWDER COATING DISPERSION FOR PACKAGING CONTAINERS

FIELD OF THE INVENTION

The present invention relates to an aqueous powder coating dispersion which is particularly suitable as a coating for packaging containers.

BACKGROUND OF THE INVENTION

Liquid coating materials are currently used with preference for the coating of packaging containers. Such coating materials give rise to numerous environmental problems because of their solvent content. The same applies when waterborne coating materials are employed.

Attempts to replace these coating materials by low-solvent or solvent-free materials are therefore being intensified. Thus, for example, thermoplastic powder coatings have already been employed in numerous instances for the covering of weld seams on cans. These products are prepared by expensive cold grinding from the corresponding thermoplastics.

In addition, EP-B 119 164 discloses thermosetting powder coatings for the weld-seam covering of metal containers which are used to accommodate foodstuffs or beverages. These thermosetting powder coatings contain as binder a mixture of an aromatic epoxy resin having on average not more than 2 epoxide groups per molecule and of an aromatic epoxy resin having on average more than 2 epoxide groups per molecule. As curing agent, the condensation product of bisphenol A diglycidyl ether with bisphenol A and/or an acidic polyester based on trimellitic anhydride/aliphatic polyol is employed.

EP-B-10 805 discloses powder coatings for the interior coating of cans, which contain a polyester having terminal carboxyl groups and an OH number of less than 10 mg of KOH/g and an epoxy resin. As curing catalyst, these powder coatings contain choline derivatives. Powder coatings have an average particle size between 20 and 150 μm. EP-B-10 805, however, contains no indications as to how can interior coatings can be obtained which give closed films even at layer thicknesses μ 15 μm. Furthermore, owing to the low OH number of the polyester, these powder coatings have the disadvantage of poor crosslinking. Correspondingly, this system exhibits drying times of from 10 to 40 min at from 150° to 220° C.; which are unacceptable in practice, whereas the drying time of modern manufacturing plants is not more than 20 to 30 s at a component temperature of from 260° to 280° C. U.S. Pat. No. 4,497,837 discloses powder coatings for the interior coating of cans and can lids, which contain an epoxy resin and aromatic amines, Lewis acids or acid anhydrides as curing agents. The powder coatings have an average particle size of between 20 and 150 μm, preferably from 30 to 70 μm. A disadvantage of these systems is the high minimum layer thickness of 38 μm required in order to obtain coatings without excessive porosity. Furthermore, these powder coatings have the disadvantage that curing of the systems described requires residence times in the oven of between 5 and 12 min.

In addition, U.S. Pat. No. 3,962,486 discloses powder coatings for the interior coating of cans, which likewise contain an epoxy resin and aromatic amines, epoxy-amine adducts or acid anhydrides. By using the plasma spray coating method, it is possible to produce coatings which even at low layer thicknesses of less than 13 μm meet the requirements which are commonly placed on interior coatings of foodstuffs packaging. In order to fulfill the condition of applicability by means of the plasma spraying method, the only powder coatings which can be employed are those having a maximum particle size μ 100 μm and a sufficiently low melt viscosity.

The use of amine-type curing agents leads, however, to inadequate sterilization resistance in the resulting coatings. Further disadvantages are that epoxy resins cured with amines have a tendency toward embrittlement and have very poor elasticities. Acid anhydride curing agents have the disadvantage that they are highly irritant and that, consequently, particular precautionary measures are necessary in the formulation of powder coatings. Finally, U.S. Pat. No. 4,183,974 discloses powder coatings for the interior coating of cans, which contain an epoxy resin and an amine curing agent. These powder coatings have average particle sizes of between 1 and 100 μm, preferably between 1 and 10 μm. Although the resulting coatings have the low degree of porosity required even at layer thicknesses of μ 13 μm, the resulting coatings are in need of improvement.

The results obtained with powder coatings have all in all not been satisfactory up to now, and, in particular, increased layer thicknesses are necessary in order to achieve a uniform appearance. On the other hand, the use of coating materials in powder form dictates a different application technology. The plant designed for liquid coating materials can therefore not be used for this purpose. Consequently, the aim is to develop powder coatings in the form of aqueous dispersions which can be processed using liquid-coating technologies. U.S. Pat. No. 4,268,542, for example, discloses a process in which a powder coating slurry is used which is suitable for the coating of automobiles. In this case, a conventional powder coat is first of all applied to the bodywork, and the clearcoat slurry is applied as second coat. In this process, it is accordingly not possible to obtain applied coats using conventional liquid-coating technologies. In the following text, the term powder coating dispersion is used as a synonym for powder coating slurry.

SUMMARY OF THE INVENTION

The object of the present invention, then, is to provide an aqueous powder coating dispersion based on epoxy resins and phenolic curing agents or carboxyl-containing polyesters for the coating of packaging containers, which dispersion can be applied using the previous liquid-coating technology.

DESCRIPTION OF THE PREFERRED EMBODIMENTS

This object is achieved by an aqueous powder coating dispersion consisting of a solid, pulverulent component I and an aqueous component II, component I being a powder coating 1) which contains A) at least one epoxy resin having an epoxide equivalent weight of from 300 to 5500 and B) at least one curing agent having more than one phenolic hydroxyl group per molecule and a hydroxyl equivalent weight, based on phenolic OH groups, of from 100 to 500, preferably from 200 to 300, or C) at least one polyester having an acid number of from 25 to 120 mg of KOH/g and an OH number >10 mg of KOH/g, and D) at least one epoxy resin having an epoxide equivalent weight of from 400 to 3000, and 2) which contains, if desired, catalysts, auxiliaries, additives typical for powder coatings such as degassing agents, leveling agents, free-radical scavengers and antioxidants, and component II being the aqueous component of the dispersion which contains a) at least one nonionic or anionic thickener and
b) if desired, catalysts, auxiliaries, defoaming agents, wetting agents, dispersion auxiliaries, preferably carboxyl-containing dispersants, antioxidants, biocides, small quantities of solvent, leveling agents, neutralizing agents, preferably amines, and/or hygroscopic agents.

The invention additionally relates to a process for the interior coating of packaging containers, in which these powder coatings are applied.

Finally, the invention also relates to the use of the powder coating dispersion for the interior coating of packaging containers.

The powder coatings according to the invention are distinguished in that coatings having only a very low layer thickness of $\mu$ 15 $\mu$m have the properties which are required by can manufacturers for interior coatings. In particular, even at a low coating thickness of $\mu$ 15 $\mu$m these coatings have the low degree of porosity required. Furthermore, these coatings are distinguished by good adhesion, high flexibility and good pasteurization and sterilization resistance. In the text below, first of all, the individual components of the powder coatings according to the invention will be described in more detail.

The epoxy resins (component A) employed in the powder coatings of the invention are solid epoxy resins having an epoxide equivalent weight of from 300 to 5500. Resins suitable as component A are aromatic, aliphatic and/or cycloaliphatic epoxy resins. Preference is given to employing aromatic epoxy resins based on bisphenol A and/or bisphenol F and/or epoxy resins of the novolak type. Epoxy resins based on bisphenol A or bisphenol F which are employed with particular preference have an epoxide equivalent weight of from 500 to 2000. Epoxy resins of the novolak type which are employed with particular preference have an epoxide equivalent weight of from 500 to 1000. In this context, epoxy resins based on bisphenol A and/or bisphenol F generally have a functionality of not more than 2, while epoxy resins of the novolak type generally have a functionality of at least 2. However, the epoxy resins based on bisphenol A and/or bisphenol F can also be brought to a functionality of more than 2 by branching, for example using trimethylolpropane, glycerol, pentaerythritol or other branching reagents.

It is of course also possible to employ other epoxy resins, for example alkylene glycol diglycidyl ethers or branched follow-on products thereof, epoxy resins flexibilized with alkylene glycols and based on bisphenol A and/or F, or the like. In addition, mixtures of various of the abovementioned epoxy resins are also suitable.

Examples of suitable epoxy resins are the products which are commercially available under the following names: Epikote 154, 1001, 1002, 1055, 1004, 1007, 1009, 3003-4F-10 from Shell-Chemie, XZ 86 795 and DER 664, 667, 669, 662, 642U and 672U from Dow and Araldite GT 6064, GT 7072, GT 7203, GT 7004, GT 7304, GT 7097 and GT 7220 from Ciba Geigy.

In this context it is preferred to employ epoxy resins which are permitted by the FDA.

Compounds which are suitable as curing component B are all solid compounds containing more than one phenolic OH group, preferably from 1.8 to 4 and, with particular preference, $\mu$ 3 phenolic OH groups per molecule and having a hydroxyl equivalent weight, based on OH groups, of from 100 to 500, preferably from 200 to 300.

As curing agents, it is preferred to employ those based on bisphenol A and/or bisphenol F. A particularly preferred curing agent is the condensation product of diglycidyl ether of bisphenol A and/or bisphenol F with bisphenol A and/or bisphenol F, in particular the condensation product having an equivalent weight, based on phenolic hydroxyl groups, of from 220 to 280. These condensation products are commonly prepared by reacting, in general, excess bisphenol with a bisphenol diglycidyl ether in the presence of an appropriate catalyst. The condensation product is preferably prepared by reacting the diglycidyl ether with the bisphenol in a weight ratio of from 0.5 to 2. The curing agents based on these condensation products of bisphenol diglycidyl ether with a bisphenol have in general a functionality of not more than 2, although higher functionalities can again be formulated by the use of branching reagents.

Other suitable curing agents are the reaction products of bisphenols with epoxy resins of the novolak type. These curing agents are preferably obtained by reacting the epoxy resin with the bisphenol in a weight ratio of from 0.5 to 2 in the presence of a suitable catalyst.

Suitable examples are the phenolic curing agents described in DE-C 23 12 409 in column 5, line 2 to column 6, line 55. These polyphenols correspond to the following general formulae in which A is a divalent hydrocarbon radical of 1–6 carbon atoms or the radicals X are hydrogen or alkyl of 1 to 4 carbon atoms, n has an average value of 1 to 9, preferably 2 to 7, and y has a value of 0 or 1. It is also possible to employ the phenolic curing agents described in DE-A 30 27 140.

Also suitable, of course, are curing agents modified with branching reagents, and/or flexibilized curing agents. Furthermore, it is also possible to employ mixtures of various of the abovementioned curing agents. In this context, it is preferred to employ FDA-authorized curing agents.

The epoxy resin component A is commonly employed in the powder coatings of the invention in a quantity of from 29 to 80% by weight, preferably from 39 to 60% by weight, based in each case on the overall weight of the powder coating.

The curing component B is employed in the powder coatings according to the invention conventionally in a quantity of from 10 to 50% by weight, preferably from 15 to 40% by weight, based in each case on the overall weight of the powder coating.

As a further component, the powder coatings according to the invention contain at least one curing catalyst, conventionally in a quantity of from 0.01 to 5.0% by weight, preferably from 0.05 to 2.0% by weight, based in each case on the overall weight of the powder coating.

The catalyst is advantageously imidazole, 2-methylimidazole, ethyltriphenylphosphonium chloride or another salt thereof, a quinoline derivative as described, for example, in EP-B-10 805, a primary, secondary or tertiary aminophenol, aluminum acetylacetonate or a toluenesulfonic acid salt, or a mixture of various of the abovementioned catalysts.

Conventionally, the commercially available hydroxyl-containing curing agents already contain a curing catalyst.

Examples of such commercially available hydroxyl-containing curing agents whose employment is preferred are the products which are commercially available under the following names: D.E.H.R 81, D.E.H.R 82 and D.E.H.R 84 from Dow, Härter [curing agent] XB 3082 from Ciba Geigy and Epikure 169 and 171 from Shell-Chemie.

The polyesters (component C) which are employed in the powder coatings according to the invention have an acid number of from 25 to 120 mg of KOH/g, preferably from 30 to 90 mg of KOH/g and, with particular preference, from 60 to 90 mg of KOH/g, and an OH number of at least 10 mg of KOH/g, preferably of at least 15 mg of KOH/g and preferably less than or equal to 30 mg of KOH/g. It is preferred to employ polyesters having a functionality 2. The number-average molecular weights of the polyesters are in general between 1000 and 10,000, preferably between 1500 and 5000. Preferably, FDA-authorized (FDA=Food and Drug Administration of the U.S.A.) polyesters are employed.

These carboxyl- and hydroxyl-containing polyesters can be prepared by the conventional methods (cf. e.g. Houben-Weyl, Methoden der organischen Chemie, 4th Edition, Volume 14/2, Georg Thieme Verlag, Stuttgart 1961).

Suitable carboxylic acid components for the preparation of the polyesters are aliphatic, cycloaliphatic and aromatic di- and polycarboxylic acids, for example phthalic acid, terephthalic acid, isophthalic acid, trimellitic acid, pyromellitic acid, adipic acid, succinic acid, glutaric acid, pimelic acid, suberic acid, azelaic acid, sebacic acid, etc. Such acids can also be employed in the form of their esterifiable derivatives (e.g. anhydrides) or their transesterifiable derivatives (e.g. dimethyl esters).

Suitable alcohol components for the preparation of the polyesters are the di- and/or polyols which are commonly employed, for example ethylene glycol, 1,2- and 1,3-propanediol, butanediols, diethylene glycol, triethylene glycol, tetraethylene glycol, 1,6-hexanediol, neopentylglycol, 1,4-dimethylolcyclohexane, glycerol, trimethylolethane, trimethylolpropane, pentaerythritol, ditrimethylolpropane, diglycerol, and the like. The polyesters obtained in this way can be employed individually or as a mixture of different polyesters.

Furthermore, the solid powder coatings may if desired also contain auxiliaries and additives. Examples of such substances are leveling agents, antioxidants, free-radical scavengers, flow aids and degassing agents such as, for example, benzoin.

Furthermore, the powder coatings according to the invention may also contain from 0 to 55% by weight, preferably from 15 to 25% by weight, of fillers. It is preferred to employ FDA-authorized fillers. Those employed are in general inorganic fillers, for example titanium dioxide, such as Kronos 2160 from Kronos Titan, Rutil R 902 from Du Pont and RC 566 from Sachtleben, barium sulfate and silicate-based fillers such as, for example, talc, kaolin, magnesium aluminum silicates, mica, and the like. It is preferred to employ titanium dioxide and fillers of the quartz sand type.

The powder coatings according to the invention can additionally contain, if desired, 0.01 to 10% by weight, preferably from 0.1 to 2% by weight, based on the overall weight of the powder coating, of further auxiliaries and additives. Examples thereof are leveling agents, flow aids and deaerating agents such as, for example, benzoin, pigments or the like. For the thickeners in accordance with component II it is possible to employ polyurethane or acrylate thickeners and modified cellulose. For applications in which the coating comes into direct contact with foodstuffs, only FDA-authorized acrylate- or cellulose-based thickeners are employed.

The solid powder coatings are prepared by known methods (cf. e.g. the product information sheet from BASF Lacke+Farben AG entitled "Pulverlacke" [powder coatings], 1990) by homogenization and dispersion, using, for example, an extruder, screw kneading apparatus and the like. Following the preparation of the powder coatings, they are prepared for dispersion by grinding and, if desired, by classifying and screening.

The powder can then be used to prepare the aqueous powder clearcoat dispersion with an aqueous component II by wet milling or by stirring in dry-ground powder coating material. Wet milling is particularly preferred.

Accordingly, the present invention also relates to a process for the preparation of an aqueous powder coating dispersion for the coating of packaging containers, in which process an aqueous dispersion is prepared from a solid, pulverulent component I and an aqueous component II, component I being a powder coating
1) which contains
A) at least one epoxy resin having an epoxide equivalent weight of from 300 to 5500 and
B) at least one curing agent having more than one phenolic hydroxyl group per molecule and a hydroxyl equivalent weight, based on phenolic OH groups, of from 100 to 500, preferably from 200 to 300, or
C) at least one polyester having an acid number of from 25 to 120 mg of KOH/g and an OH number >10 mg of KOH/g, and
D) at least one epoxy resin having an epoxide equivalent weight of from 400 to 3000, and
2) which contains, if desired, catalysts, auxiliaries, additives typical for powder coatings such as degassing agents, leveling agents, free-radical scavengers and antioxidants, and component II being the aqueous component of the dispersion which contains
a) at least one nonionic or anionic thickener and
b) if desired, catalysts, auxiliaries, defoaming agents, wetting agents, dispersion auxiliaries, preferably carboxyl-containing dispersants, antioxidants, biocides, small quantities of solvent, leveling agents, neutralizing agents, preferably amines, and/or hygroscopic agents, the dispersion prepared from components I and II is milled, while maintaining a temperature of from 0° to 50° C., preferably from 5° to 30° C., and the pH of the dispersion is adjusted to from 4 to 10, preferably from 5 to 9.

The average particle size is between 1 and 20 μm, preferably below 20 μm. It is with particular preference from 2 to 12 μm. The solids content of the aqueous powder clearcoat dispersion is between 10 and 50%, preferably from 20 to 40%. The glass transition temperature of the powder coating is from 20° to 70° C., preferably from 30° to 60° C.

It is possible to add to the dispersion, prior to or subsequent to the wet milling or the incorporation of the dry powder coating material into the aqueous component II, from 0 to 5% by weight of an antifoam mixture, of an ammonium and/or alkali metal salt, of a carboxyl-functional or nonionic dispersion auxiliary, wetting agent and/or thickener mixture, and of the other additives. Preferably, in accordance with the invention, antifoams, dispersion auxiliaries, wetting agents and/or thickeners are first of all dispersed in water. Subsequently, small portions of the powder clearcoat are stirred in. After that, antifoams, dispersion auxiliaries, thickeners and wetting agents are again incorporated by dispersion. Finally, the incorporation of powder clearcoat in small portions by stirring is repeated.

The pH is adjusted, in accordance with the invention, preferably by means of ammonia or amines. In this context, the pH may first of all rise, so that a strongly basic dispersion is formed. However, the pH falls again to the values given above within several hours or days.

The powder clearcoat dispersion according to the invention can be used as a coating material for packaging containers.

The packaging containers which are coated with the powder coatings according to the invention may consist of a wide variety of materials, may have a wide variety of shapes and sizes and may have been produced by various processes. The powder coating dispersions according to the invention are, however, used in particular to coat metallic containers. These metal containers can have been produced by first of all rolling sheet metal and then joining it by bending at the edges. The end pieces can then be attached to the cylinder formed in this way. The powder coatings according to the invention are used both for covering the weld seam and for the interior coating of the can bodies, which in general already have a bottom. Furthermore, deep-drawn metal containers can also be coated internally with the powder coatings according to the invention. However, the powder coatings are of course also suitable for the coating of can lids and can bottoms.

The packaging containers may consist of a wide variety of materials such as, for example, aluminum, black plate, tin-plate and various ferrous alloys, which are provided, if desired, with a passivating layer based on compounds of nickel, chromium and of tin. Containers of this kind are conventionally used as containers for foodstuffs and beverages, for instance for beer, juices, carbonated drinks, soups, vegetables, meat dishes, fish dishes and also, for example, for petfood. Application of the coatings takes place by known methods as are employed for liquid coating materials.

For the interior coating of the packaging containers, the powder coating dispersions are conventionally applied in a layer thickness μ 15 μm, preferably from 10 to 14 μm. Even at these low layer thicknesses, the coatings meet the requirements which are commonly placed on such films. The powder coating dispersions may, however, of course also be applied in greater layer thicknesses.

What is claimed is:

1. An aqueous powder coating dispersion, which dispersion comprises a solid, pulverulent component I and an aqueous component II, component I being a powder coating which comprises
   A) at least one epoxy resin having an epoxide equivalent weight of from 300 to 5500 and
   B) at least one compound selected from the group consisting of phenolic curing agents having more than one phenolic hydroxyl group per molecule and a hydroxyl equivalent weight, based on phenolic hydroxyl groups, of from 100 to 500 and polyesters having an acid number of from 25 to 120 mg of KOH/g and an OH number >10 mg of KOH/g; and component II being an aqueous component of which contains at least one nonionic or anionic thickener.

2. An aqueous powder coating dispersion as claimed in claim 1, which has a pH of between 4 and 10, a glass transition temperature of from 20° to 70° C., and a solids content of from 10 to 50% by weight.

3. An aqueous powder coating dispersion as claimed in claim 1, wherein the powder coating-has a particle size distribution such that the average particle size of the powder coating particles is between 3 and 12 μm.

4. An aqueous powder coating dispersion as claimed in claim 1, wherein the powder coating contains as component A an epoxy resin selected from the group consisting of epoxy resins based on bisphenol A, epoxy resins based on bisphenol F, having an epoxide equivalent weight of from 500 to 2000, novolac epoxy resins having an epoxide equivalent weight of from 500 to 1000, and mixtures thereof.

5. An aqueous powder coating dispersion as claimed in claim 1, wherein the powder coating contains as component B a curing agent based on at least one member selected from the group consisting of bisphenol A, bisphenol F, and mixtures thereof.

6. An aqueous powder coating dispersion as claimed in claim 1, wherein said component I further comprises at least one compound selected from the group consisting of catalysts, degassing agents, leveling agents, free-radical scavengers, antioxidants, flow aids, titanium dioxide, barium sulfate, silicate-based fillers, and mixtures thereof.

7. An aqueous powder coating dispersion as claimed in claim 1, wherein said component II further comprises at least one compound selected from the group consisting of catalysts, defoaming agents, wetting agents, dispersants, antioxidants, biocides, solvent, leveling agents, neutralizing agents, hygroscopic agents, and mixtures thereof.

8. An aqueous powder coating dispersion as claimed in claim 1, wherein said component B) is selected from the phenolic curing agents.

9. An aqueous powder coating dispersion as claimed in claim 8, wherein said phenolic curing agents have a hydroxyl equivalent weight, based on phenolic hydroxyl groups, of from 200 to 300.

10. An aqueous powder coating dispersion as claimed in claim 8, wherein said phenolic curing agents have from 1.8 to 4 phenolic hydroxyl groups per molecule.

11. An aqueous powder coating dispersion as claimed in claim 8, wherein said phenolic curing agents have from 1.8 to 2.2 phenolic hydroxyl groups per molecule.

12. An aqueous powder coating dispersion as claimed in claim 8, wherein the powder coating contains
   A) from 29 to 80% by weight, based on the overall weight of the powder coating, of the epoxy resin component A and
   B) from 10 to 50% by weight, based on the overall weight of powder coating, of the component B phenolic curing agents.

13. An aqueous powder coating dispersion as claimed in claim 1, wherein said epoxy resin (A) as an epoxide equivalent weight of from 400 to 3000, and further wherein said component (B) is selected from the polyesters.

14. An aqueous powder coating dispersion as claimed in claim 13, wherein the powder coating contains
   A) from 19 to 80% by weight, based on the overall weight of the powder coating, of the epoxy resin component A and
   B) from 19 to 80% by weight, based on the overall weight of powder coating, of the component B polyesters.

15. An aqueous powder coating dispersion as claimed in claim 1, having a pH of between 5 and 9, a glass transition temperature of from 30° to 60° C., and a solids content of from 20 to 40% by weight.

16. A coated substrate comprising the interior of a packaging container having thereon a powder coating as claimed in claim 1.

17. A weld-seam coating for packaging containers comprising an aqueous powder coating dispersion, which comprises a solid, pulverulent component I and an aqueous component II, component I being a powder coating which contains at least one polyester having an acid number of from 25 to 120 mg of KOH/g and an OH number of >10 mg of KOH/g, and at least one epoxy resin having an epoxide equivalent weight of from 400 to 3000; and component II being an aqueous component which contains at least one nonionic or anionic thickener.

18. The weld-seam coating of claim 17, which contains as the polyester component one or more polyesters based on compounds selected from the group consisting of terephthalic acid, trimellitic acid and mixtures thereof and compounds selected from the group consisting of ethylene glycol, neopentylglycol and mixtures thereof.

19. The weld-seam coating as claimed in claim 17, wherein said polyester has an acid number of from 30 to 90 mg of KOH/g and an OH number of from 15 to 30 mg of KOH/g, and further wherein said epoxy resin has an epoxide equivalent weight of from 600 to 900.

20. The weld-seam coating as claimed in claim 17, wherein said component I further comprises at least one compound selected from the group consisting of catalysts, degassing agents, leveling agents, free-radical scavengers, antioxidants, flow aids, titanium dioxide, barium sulfate, silicate-based fillers, and mixtures thereof.

21. The weld-seam coating as claimed in claim 17, wherein said component II further comprises at least one compound selected from the group consisting of catalysts, defoaming agents, wetting agents, dispersants, antioxidants, biocides, solvent, leveling agents, neutralizing agents, hygroscopic agents, and mixtures thereof.

22. A process for the preparation of an aqueous powder coating dispersion comprising the steps of:

preparing an aqueous dispersion from a solid, pulverulent component I and an aqueous component II, component I being a powder coating which contains A) at least one epoxy resin having an epoxide equivalent weight of from 300 to 5500 and B) at least one compound selected from the group consisting of phenolic curing agents having more than one phenolic hydroxyl group per molecule and a hydroxyl equivalent weight, based on phenolic hydroxyl groups, of from 100 to 500 and polyesters having an acid number of from 25 to 120 mg of KOH/g and an OH number >10 mg of KOH/g; and component II being an aqueous component which contains at least one nonionic or anionic thickener;

milling the dispersion prepared from components I and II, while maintaining a temperature of from 0° to 50° C., and adjusting the pH of the dispersion to from 4 to 10.

23. The process for the preparation of an aqueous powder coating dispersion as claimed in claim 22, wherein said component I further comprises at least one compound selected from the group consisting of catalysts, degassing agents, leveling agents, free-radical scavengers, antioxidants, flow aids, titanium dioxide, barium sulfate, silicate-based fillers, and mixtures thereof.

24. The process for the preparation of an aqueous powder coating dispersion as claimed in claim 22, wherein said component II further comprises at least one compound selected from the group consisting of catalysts, defoaming agents, wetting agents, dispersants, antioxidants, biocides, solvent, leveling agents, neutralizing agents, hygroscopic agents, and mixtures thereof.

25. The process for the preparation of an aqueous powder coating dispersion as claimed in claim 22, wherein said component (B) is selected from the phenolic curing agents.

26. The process for the preparation of an aqueous powder coating dispersion as claimed in claim 25, wherein said phenolic curing agents have a hydroxyl equivalent weight, based on phenolic hydroxyl groups, of from 200 to 300.

27. The process for the preparation of an aqueous powder coating dispersion as claimed in claim 22, Wherein said epoxy resin (A) has an epoxide equivalent weight of from 400 to 3000, and further wherein said component (B) is selected from the polyesters.

28. The process for the preparation of an aqueous powder coating dispersion as claimed in claim 22, wherein said milling temperature is from 5° to 30° C.

29. The process for the preparation of an aqueous powder coating dispersion as claimed in claim 22, wherein said pH of said dispersion is from 5 to 9.

30. A process for coating packaging containers, which comprises applying an aqueous powder coating dispersion as claimed in claim 1, in a layer thickness <15 μm.

* * * * *